United States Patent [19]

Esmersoy

[11] Patent Number: 4,809,239

[45] Date of Patent: Feb. 28, 1989

[54] METHOD FOR EVALUATING PARAMETERS RELATED TO THE ELASTIC PROPERTIES OF SUBSURFACE EARTH FORMATIONS

[75] Inventor: Cengiz Esmersoy, Danbury, Conn.

[73] Assignee: Schlumberger Technology Corporation, New York, N.Y.

[21] Appl. No.: 73,023

[22] Filed: Jul. 14, 1987

[51] Int. Cl.$^4$ .............................................. G01V 1/40
[52] U.S. Cl. ...................................... 367/57; 367/33; 367/48; 367/75
[58] Field of Search ...................... 367/31, 73, 75, 25, 367/33, 48, 57; 364/422

[56] References Cited

U.S. PATENT DOCUMENTS

| | | | |
|---|---|---|---|
| 4,562,557 | 12/1985 | Parko et al. | 367/73 |
| 4,563,757 | 1/1986 | Decorps et al. | 367/33 |
| 4,648,039 | 3/1987 | Devaney et al. | 364/421 |
| 4,679,174 | 7/1987 | Gelfand | 367/73 |

OTHER PUBLICATIONS

"Interpretation of Velocity Spectra through an Adaptive Modeling Strategy," Davis, J. M. Geophysics, vol. 37 #6 1972.

C. Esmersoy et al., "Three Component Array Processing", The VELA Program: A Twenty-Five Year Review of Basic Research, Defense Advanced Research Projects Agency, A. U. Kerr, Editor, pp. 565-578 (1985).

Primary Examiner—Thomas H. Tarcza
Assistant Examiner—Ian J. Lobo
Attorney, Agent, or Firm—Clifford L. Tager; Peter Y. Lee; Keith G. W. Smith

[57] ABSTRACT

Three-axis vertical seismic profile measurements are analyzed to derive values for the velocity $v_p$ and angel of incidence $\Psi_p$ of a plane compressional wave at the borehole and for the shear wave velocity $v_s$ and angle of incidence $\Psi_s$ of a plane shear wave at the borehole. In the described embodiment this is accomplished by finding values for these parameters which maximize the expression $$\Sigma_\omega [|(a_p+a_s)^H u(\omega)|^2 / \|a_p+a_s\|^2 + |(a_p-a_s)^H u(\omega)|^2 / \|a_p-a_s\|^2$$

where $\omega$ is angular frequency;

$a_p$ and $a_s$ are column vectors representing compressional and shear wave particle motions at frequency $\omega$ at a multiplicity of locations in the borehole;

$u(\omega)$ represents components in a plane of waveform measurements obtained at these locations;

$\| \ \|$ represents the Euclidean norm of a complex vector; and $()^H$ denotes the complex conjugate transpose of a matrix.

9 Claims, 4 Drawing Sheets

METHOD FOR EVALUATING PARAMETERS RELATED TO THE ELASTIC PROPERTIES OF SUBSURFACE EARTH FORMATIONS

BACKGROUND OF THE INVENTION

This invention relates to methods for evaluating parameters related to the elastic properties of subsurface earth formations, in particular the velocity and direction of propagation of compressional (P) and shear (S) wave components of acoustic energy propagating through the formations. The invention also provides a way of separating the individual waveforms of such components.

Seismic investigation of earth formations is a well-established means of deriving information about subsurface geological conditions, and is a valuable tool in the search for natural resources such as oil, gas and ores. In such an investigation a seismic wave is propagated through the earth formation to be investigated, by means of a source such as an explosion or a mechanical vibrator. One or more acoustic detectors spaced from the source are used to sense the propagating seismic wave as it passes different locations and comparison of waves detected at these different locations enables information about the formation to be inferred. In one form of seismic investigation the source and/or the detectors are placed in deep boreholes drilled into the earth formation, enabling a vertical seismic profile (VSP) or well-to-well profile to be obtained. The detectors are typically 3-axis geophones which are placed in firm contact with the wall of the borehole and which can produce electrical signals indicative of movement of the formation along each of three orthogonal axes.

The waveform signals thus derived can be analyzed in a variety of ways to obtain information about subsurface conditions. Recently interest has been increasing in the possibility of deriving individual values for the compressional and shear propagation characteristics of formations. Whereas fluids can only support compressional (P) sonic waves, in which the particle motion comprising the wave is parallel to the direction of wave propagation, solids can also sustain shear (S) waves, in which the direction of particle motion is transverse to the direction of wave propagation. The velocities of P and S waves are two independent parameters related to the elastic properties of formations and are of interest for various reasons. Thus one useful indicator of lithology type is the ratio of P and S wave velocities. Imaging of reflected compressional and shear waves in surface seismics or vertical seismic profiles can provide valuable information, but requires values of P and S wave velocity as a function of depth.

Techniques are already known for separating and extracting P wave components and S wave components in the waveforms obtained during VSP measurements. See for example U.S. Pat. No. 4,648,039 to Devaney et al, assigned to the assignee of this application. However, these techniques require knowledge of the velocity of propagation of the P and S waves in the formation. Determination of P wave velocity is possible by having a skilled user pick waveform events which appear characteristic of the arrival of P waves at the detectors. The time offset between corresponding arrivals at detectors having a known spacing is related to the velocity.

However, picking arrivals accurately is difficult and time-consuming even in the case of P wave events, which are generally the first significant signals to appear on a seismic recording. S wave events usually occur later, in the midst of other events such as P wave reflections and mode conversions. Thus picking S wave arrivals can be very difficult and is sometimes impossible.

Moreover, if the seismic energy is not propagating vertically, as is the case in VSP measurments with an offset source, it is necessary to determine the angle of incidence of the waves at the detectors as well as the time offset between between detectors in order to obtain correct values for the velocity of propagation. Although the angle of incidence can be determined to some extent from the particle motion of the waves within time windows specified by an experienced user, this operation again is difficult, time-consuming and subject to error, as well as requiring the intervention of a skilled user.

Accordingly there is a need for a method of determined velocities of both P and S wave propagation which is fast and reliable, which reduces or eliminates the need for user interaction and skill, and which avoids the need to identify specific events such as arrivals.

It is an object of this invention to provide a method of determining velocity of P wave and S wave propagation in a formation from three (or two) component seismic measurements such as VSP measurements, which reduces or avoids the need for identification of arrivals.

It is another object of this invention to provide a method of determining direction of P wave and S wave propagation in a formation from three (or two) component seismic measurements such as VSP measurements.

It is a further object of this invention to provide a method of separating P and S waveform components in seismic measurements such as VSP measurements.

SUMMARY OF THE INVENTION

According to one aspect of this invention there is provided a method of evaluating parameters related to the elastic properties of a subsurface earth formation traversed by a borehole. Measurements are obtained along at least two, and preferably three, orthogonal axes from a seismic profile operation in the borehole. This profile operation may be, for example, a vertical seismic profile or an offset vertical seismic profile, and may be performed with the source on the surface or in the borehole. Seismic propagation through the formation is described in terms of a model incorporating a plane compressional wave and a plane shear wave propagating with unspecified velocity and direction. Values are then derived for the velocity and direction of propagation of these plane waves that provide a best fit of the model to the measurements. Finally a tangible record of the derived values is produced.

Typically the values for the velocity and direction of propagation are derived to provide a best fit of the model to the measurements obtained at a small number (for example, between three and eleven) of adjacent measurement locations. For typical spacings between measurment locations even a deviated borehole may be incorporated in the analysis, since the curvature of a typical deviated borehole over the distance spanned by such a number of locations is so slight that it can be ignored.

It is believed that the inventor hereof is the first to suggest the possibility of analyzing seismic propagation in terms of the behavior of plane wave components over short sections of a borehole. This analysis is based on the assumptions that the measurements can be appropriately described in terms of propagation of plane wavefronts of seismic energy; that the formation is locally homogeneous and isotropic; and that there is no coupling between orthogonally polarized shear wave components. The inventor hereof has found that these assumptions are sufficiently well satisfied in most situations for the result produced by the method of the invention to be of practical benefit.

The values of compressional wave velocity $v_p$ and angle of incidence $\Psi_p$ at the borehole and of shear wave velocity $v_s$ and angle of incidence $\Psi_s$ at the borehole may be derived in accordance with the expression:

$$\max_{v_p,\Psi_p,v_s,\Psi_s} \Sigma \omega |(a_p+a_s)^H u(\omega)|^{2/} ||a_p+a_s||^2 + |(a_p-a_s)^H u(\omega)|^{2/} ||a_p-a_s||^2$$

where 107 is angular frequency;

$a_p$ and $a_s$ are column vectors representing compressional and shear wave particle motions at frequency $\omega$ at a multiplicity of locations in the borehole;

$u(\omega)$ represents components in a plane waveform measurements obtained at the locations;

$||\ ||$ represents the Euclidean norm of a complex vector; and $()^H$ denotes the complex conjugate transpose of a matrix.

Thereafter separate compressional and shear waveforms $\hat{u}_p(\omega)$ and $\hat{u}_s(\omega)$ may be derived in accordance with the expressions $$\hat{u}_p(\omega) = [(\hat{a}_p+\hat{a}_s)/||\hat{a}_p+\hat{a}_s||^2 + (\hat{a}_p-\hat{a}_s)/||\hat{a}_p-\hat{a}_s||^2]^H u(\omega)$$

$$\hat{u}_s(\omega) = [(\hat{a}_p+\hat{a}_s)/||\hat{a}_p+\hat{a}_s||^2 - (\hat{a}_p-\hat{a}_s)||\hat{a}_p-\hat{a}_s||^{2-}]^H u(\omega)$$

where $\hat{a}_p$ and $\hat{a}_s$ are values of the column vectors $a_p$ and $a_s$ corresponding to the values derived for the velocity and direction of propagation of said plane waves.

BRIEF DESCRIPTION OF THE DRAWINGS

Additional objects and features of the invention will become more apparent upon consideration of the following detailed description of the invention, reference being had to the accompanying drawings in which.

DETAILED DESCRIPTION

Figure 1:
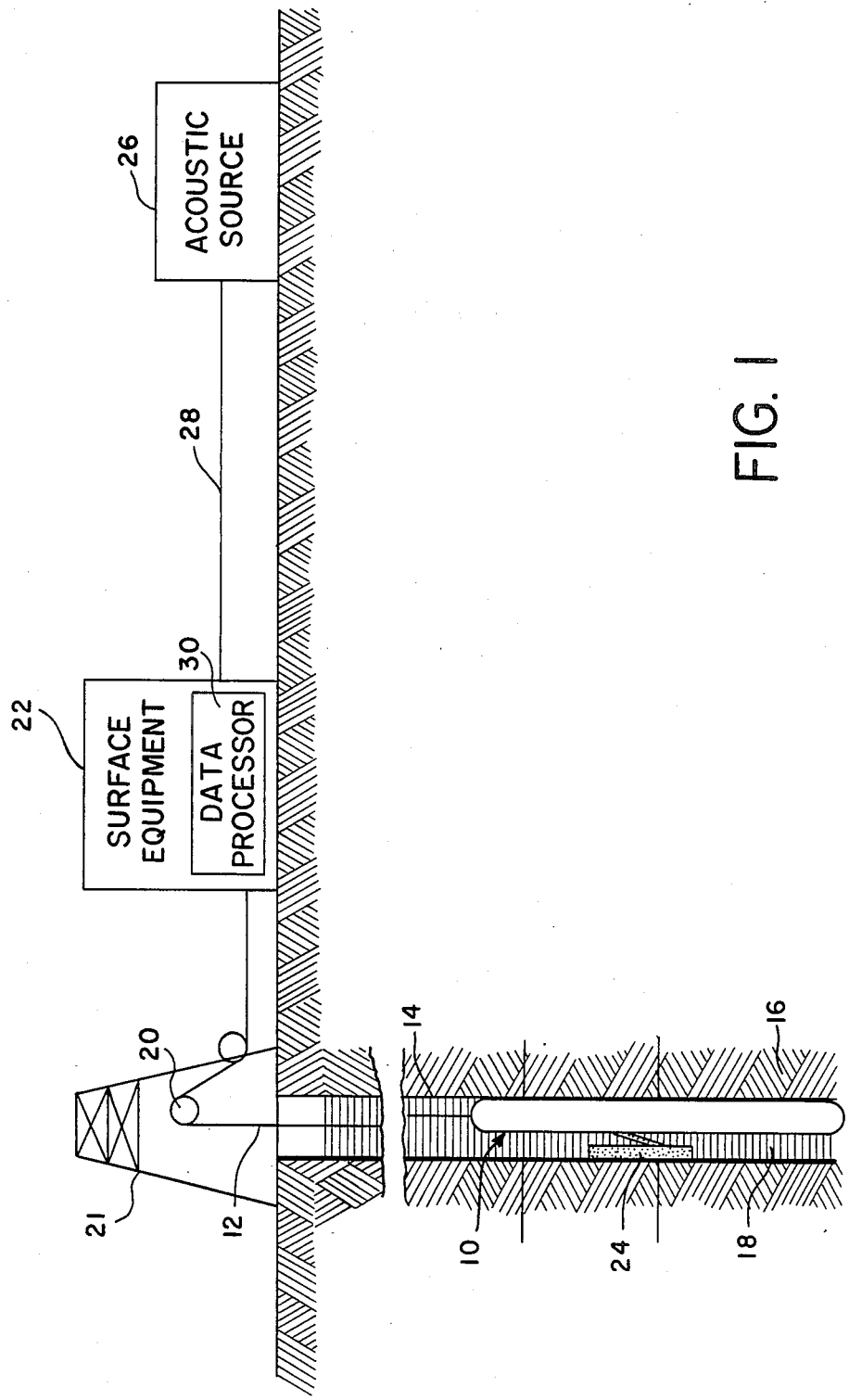
FIG. 1 is a schematic diagram of a borehole seismic operation for collecting data for use in accordance with this invention.

Referring to FIG. 1, a logging tool 10 is suspended on an armored cable 12 in a borehole 14 penetrating an earth formation 16. The borehole 14 is filled with liquid 18, for example drilling mud used to stabilize the borehole 14 (in the case of an open, uncased hole) and prevent formation fluids from escaping up the borehole. The cable 12 extends up the borehole, over a sheave wheel 20 in a derrick 21 to a winch forming part of surface equipment 22. Known depth gauge apparatus (not shown) is provided to measure cable displacement over the sheave wheel 20 and thus depth of the logging tool 10 in the borehole 14.

The tool 10 may be designed and constructed in accordance with the teaching of U.S. Pat. No. 4,563,757, which is incorporated herein by reference. In particular the tool has a retractable anchoring pad 24 for urging the body of the tool 10 firmly against the wall of the borehole 14. The body of the tool 10 includes a three-axis geophone system arranged to detect particle motion along each of three orthogonal axes and to produce electrical signals indicative thereof. The geophones are gimballed, as described in U.S. patent application Ser. No. 855,024, so that two of them have horizontal axes and the third vertical axis irrespective of orientation of the tool 10, and a device is included in the tool 10 to produce a signal indicative of orientation of the body of the tool 10. Processing and interface circuitry within the tool 10 amplifies, samples and digitizes these signals for transmission and communicates them to the surface equipment 22 via the cable 12. Electrical power and control signals for coordinating operation of the tool 10 are generated by the surface equipment 22 and likewise communicated via the cable 12 to approximate circuitry provided within the tool 10.

A source of acoustic energy 26 is located on the surface, near the borehole 14. This source may be, for example, an explosive device or an airgun in a shallow liquid-filled hole, or a vibrating device pressed against the earth's surface, and is controlled by signals transmitted along a line 28 from the surface equipment 22. Details of suitable sources are well known to those skilled in the art and need not be described here.

During acquisition of data, the logging tool 10 is positioned within the borehole 14, the pad 24 is extended to clamp the tool in place and the source 26 is energized to propagate seismic energy into the formation 16. This energy reaches the borehole 14, both directly and after reflection from interfaces between different layers constituting the formation 16. The seismic energy causes displacement of the particles comprising the formation 16, and this displacement is sensed by the geophones in the body of the tool 10 to generate electrical signals representative of the motion along each of the three orthogonal axes. These signals are transmitted via the cable 12 to the surface equipment 22 which receives and records them on chart and/or magnetic tape recorders as a function of time. In addition the equipment 22 may, as described below, analyze the data represented by these signals to yield further information which is also recorded.

When recording of the geophone signals has terminated the pad 24 is released and the cable 12 is moved by the winch to bring the tool 10 to another depth in the borehole 14, and the procedure is repeated. The distance through which the cable 12 is displaced depends on the subsequent processing of the recorded signals, which typically requires signals to be recorded at points separated by no more than a certain maximum spacing. This spacing is dependent on known manner on the minimum wavelength of the seismic signals of interest.

Further details of the operation of the tool 10 may be found in U.S. Pat. No. 4,563,757. Those skilled in the art will recognize that other ways of obtaining the required data may be used. Thus, for example, an array of geophones may be used instead of a single assembly.

The surface equipment 22 typically incorporates a data processor 30 for coordinating and controlling the logging operation, and this processor may also be used for analysis of the recorded seismic signals at the wellsite. Alternatively or in addition, the recordings may be transferred to a remote location for subsequent more detailed analysis. It will be understood by those skilled in the art that this analysis can be implemented, for example, by appropriate programming of a general purpose digital computer or by means of special purpose electronic circuitry.

The purpose of the analysis is primarily to estimate values for four parameters related to the elastic properties of the formation. These parameters are $v_p$ the velocity of compressional (P) waves in the formation;

$\Psi_p$ the direction of propagation of P waves;

$v_s$ the velocity of shear (S) waves in the formation;

$\Psi_s$ the direction of propagation of S waves.

Figure 2:
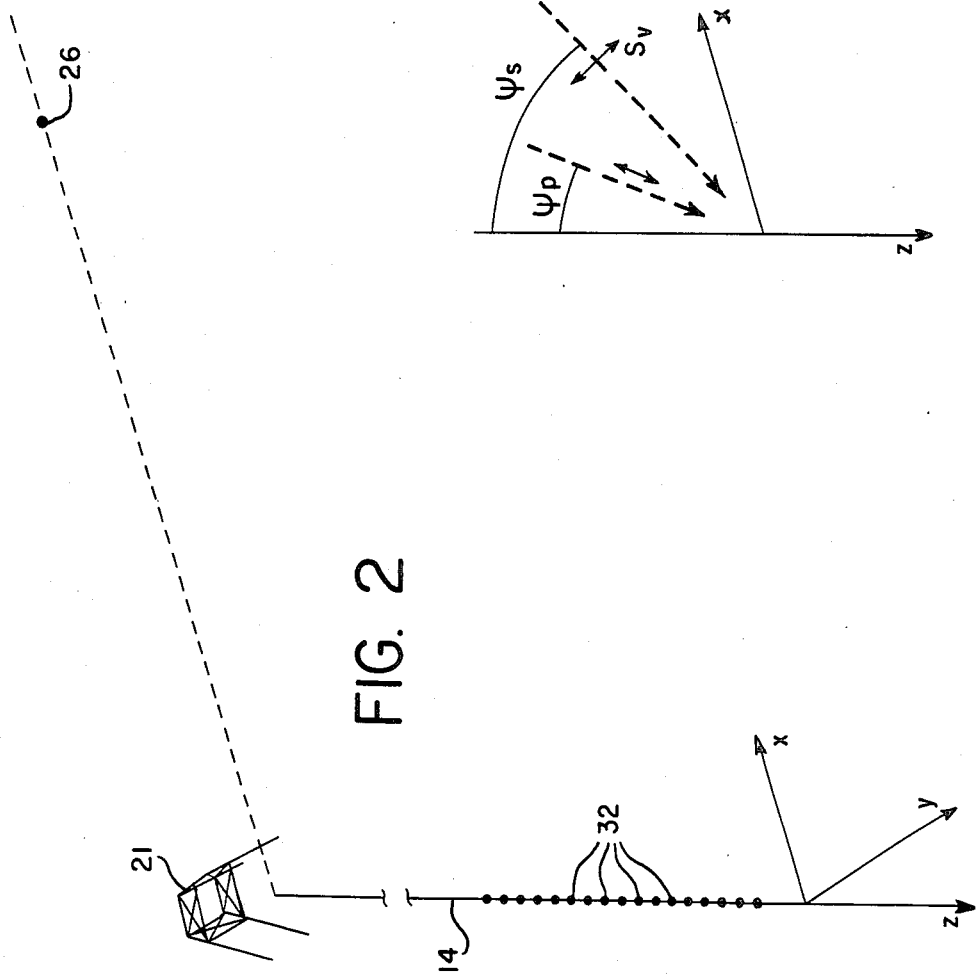
FIG. 2 is a schematic diagram showing a coordinate system used in an embodiment of the present invention.
Figure 3:
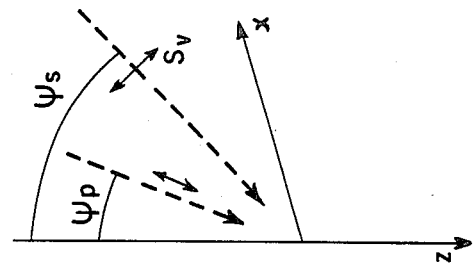
FIG. 3 is a diagram showing directions of propagation and particle motion of P and $S_V$ waves in the coordinate system of FIG. 2.

The analysis is performed in terms of plane wave components propagating in a (generally vertical) plane containing the source 26 and the measurement locations of the tool 10 in the borehole 14. Thus as shown in FIG. 2 the borehole 14 and the measurement locations 32 are considered to extend along an axis z, while the line joining the top of the borehole 14 to the position of the source 26 extends parallel to an axis x. The wave components whose parameters are determined are those components which propagate along directions contained in the x-z plane. Accordingly, the parameters $v_s$ and $\Psi_s$ relate specifically to a shear wave component with particle motion perpendicular to the propagation direction, that is to an $S_V$ (vertically polarized) shear wave (see FIG. 3). Values of the four parameters for the depth level of each measurement location are determined using the measurements for the (2M+1) locations straddling that depth level. Deviated (non-rectilinear) boreholes can also be accommodated in this analysis since the curvature of a typical deviated borehole over the distance spanned by the (2M+1) measurement locations is so slight that the interval can be considered as approximately straight.

The parameter values are estimated in effect by finding values which produce a minimum error value E in the expression $$E = \Sigma_\omega \| u(\omega) - \hat{u}(\omega) \|^2 \quad (1)$$

where $u(\omega)$ represents the components in the x-z plane of the actual waveform measurements obtained with the tool 10 at the (2M+1) measurement locations 32, $\omega$ being angular frequency;

$\hat{u}(\omega)$ represents model waveform components in the x-z plane derived from estimated values of $v_p$, $\Psi_p$, $v_s$ and $\Psi_s$; and $\| \ \|$ represents the Euclidean norm of a complex vector.

The waveform components $\hat{u}(\omega)$ are formally defined (although not actually derived) in terms of the frequency domain components $u_p(\omega)$ and $u_s(\omega)$ of separate P and $S_V$ waves respectively at the center measurement location, as follows:

$$\hat{u}(\omega) = a_p u_p(\omega) + a_s u_s(\omega) \quad (2)$$

The terms $a_p$ and $a_s$ are column vectors representing P and $S_V$ wave particle motions at frequency $\omega$ at each of the (2M+1) measurement locations. These vectors include elements for M measurement locations above and below the depth level corresponding to the center element in each vector. The vectors are defined as follows:

$$a_p{}^T = (h_p{}^T d_p{}^{-M}, \ldots, h_p{}^T, \ldots, h_p{}^T d_p{}^M) \quad (3a)$$

$$a_s{}^T = (h_s{}^T d_s{}^{-M}, \ldots, h_s{}^T, \ldots, h_s{}^T d_s{}^M) \quad (3b)$$

where $d_p{}^m = e^{(i\omega mD \cos \Psi_p)/v_p}$ and $d_s{}^m = e^{(i\omega mD \cos \Psi_s)/v_s}$ are expressions in the frequency domain for the phase shifts of the P and $S_V$ waves at each measurement location relative to the center measurement location;

m is the measurement location index $-M$ to $+M$ relative to the center location at $m=0$;

D is the spacing between measurement locations; and $h_p{}^T = (-\sin \Psi_p, \cos \Psi_p)$ and $h_s{}^T = (\cos \Psi_s, \sin \Psi_s)$ are unit vectors defining the x and x coordinate directions.

It should be noted that the vectors $a_p$, $a_s$, $h_p$ and $h_s$ are all column vectors but are set forth herein in transposed form (as indicated by the $T$ superscript) for convenient representation. Additionally expressions (3a) and (3b), and in particular the expressions for $d_p{}^m$ and $d_s{}^m$, assume an equal spacing between measurement locations. This geometry is not essential but has the advantage of simplifying the analysis.

As noted above, equation (2) is not used to actually derive the estimated waveform components $\hat{u}(\omega)$, because the P and $S_V$ waves $u_p(\omega)$ and $u_s(\omega)$ are not directly measurable separately using geophones. Indeed, one aspect of the present invention involves a determination of these waveforms separately from one another. However, the inventor hereof has found that it is possible to minimize the expression (1) in two steps, first for the desired parameters $v_p$, $\Psi_p$, $v_s$ and $\Psi_s$, and then, if required, for the waveforms $u_p(\omega)$ and $u_s(\omega)$.

In accordance with this invention, the first minimization step is performed by finding values for the parameters $v_p$, $\Psi_p$, $v_s$ and $\Psi_s$ which maximize the value of the expression $$\Sigma_\omega \frac{|(a_p + a_s)^H u(\omega)|^{2/} \|^2 + |(a_p - a_s)^H u(\omega)|^{2/} \| a_p - a_s \|^2} \quad (4)$$

where $()^H$ denotes the complex conjugate transpose of a matrix.

Thereafter, if desired, the P and $S_V$ waveforms $u_p(\omega)$ and $u_s(\omega)$ in the frequency domain may be separated from one another. To this end the values for the vectors $a_p$ and $a_s$ given by equations (3a) and (3b), for the values of the parameters $v_p$, $\Psi_p$, $v_s$ and $\Psi_s$ obtained from expression (4), are adopted as estimated vectors $\hat{a}_p$ and $\hat{a}_s$. These estimated vectors are then incorporated in the following equations to obtain estimated separated waveforms $\hat{u}_p(\omega)$ and $\hat{u}_s(\omega)$ $$\hat{u}_p(\omega) = [(\hat{a}_p + \hat{a}_s)/ \|\hat{a}_p + \hat{a}_s\|^2 + (\hat{a}_p - \hat{a}_s)/ \|\hat{a}_p - \hat{a}_s\|^2]^H u(\omega) \quad (5a)$$

$$\hat{u}_s(\omega) = [(\hat{a}_p + \hat{a}_s)/ \|\hat{a}_p + \hat{a}_s\|^2 - (\hat{a}_p - \hat{a}_s)/ \|\hat{a}_p - \hat{a}_s\|^2]^H u(\omega) \quad (5b)$$

Figure 4A:
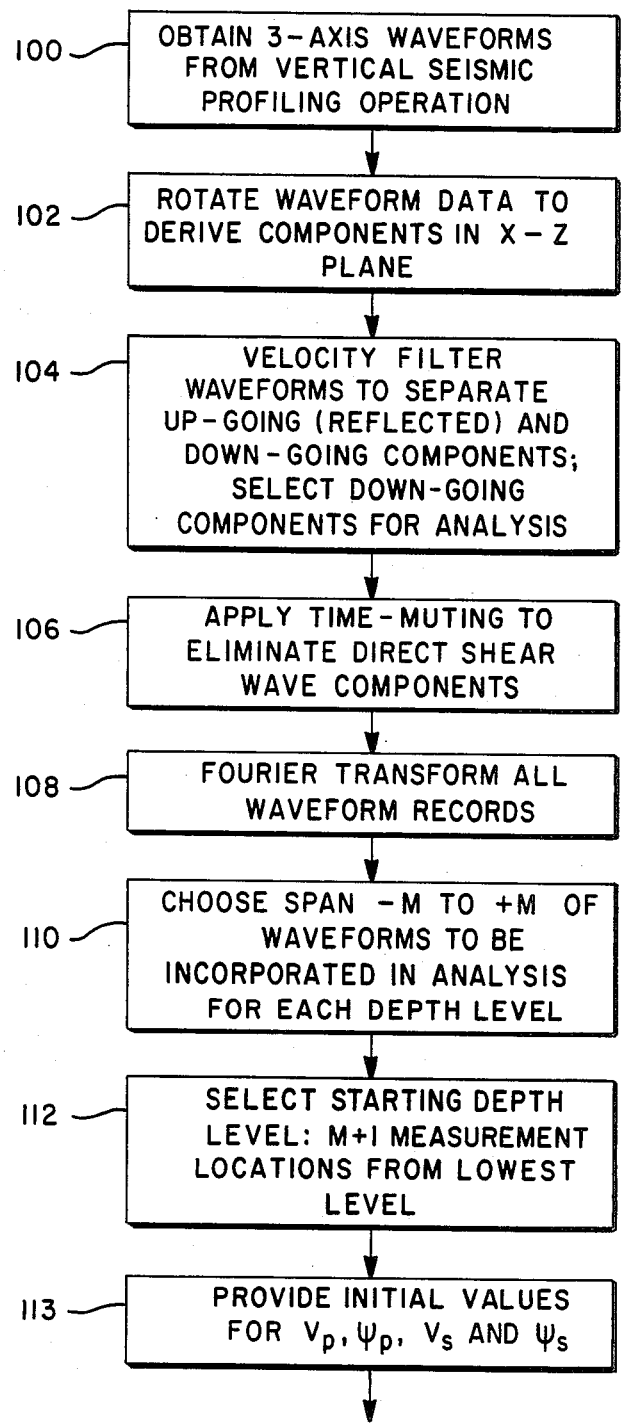
FIGS. 4a and 4b show a flow diagram of a method in accordance with this invention for evaluating parameters related to elastic properties of a formation.
Figure 4B:
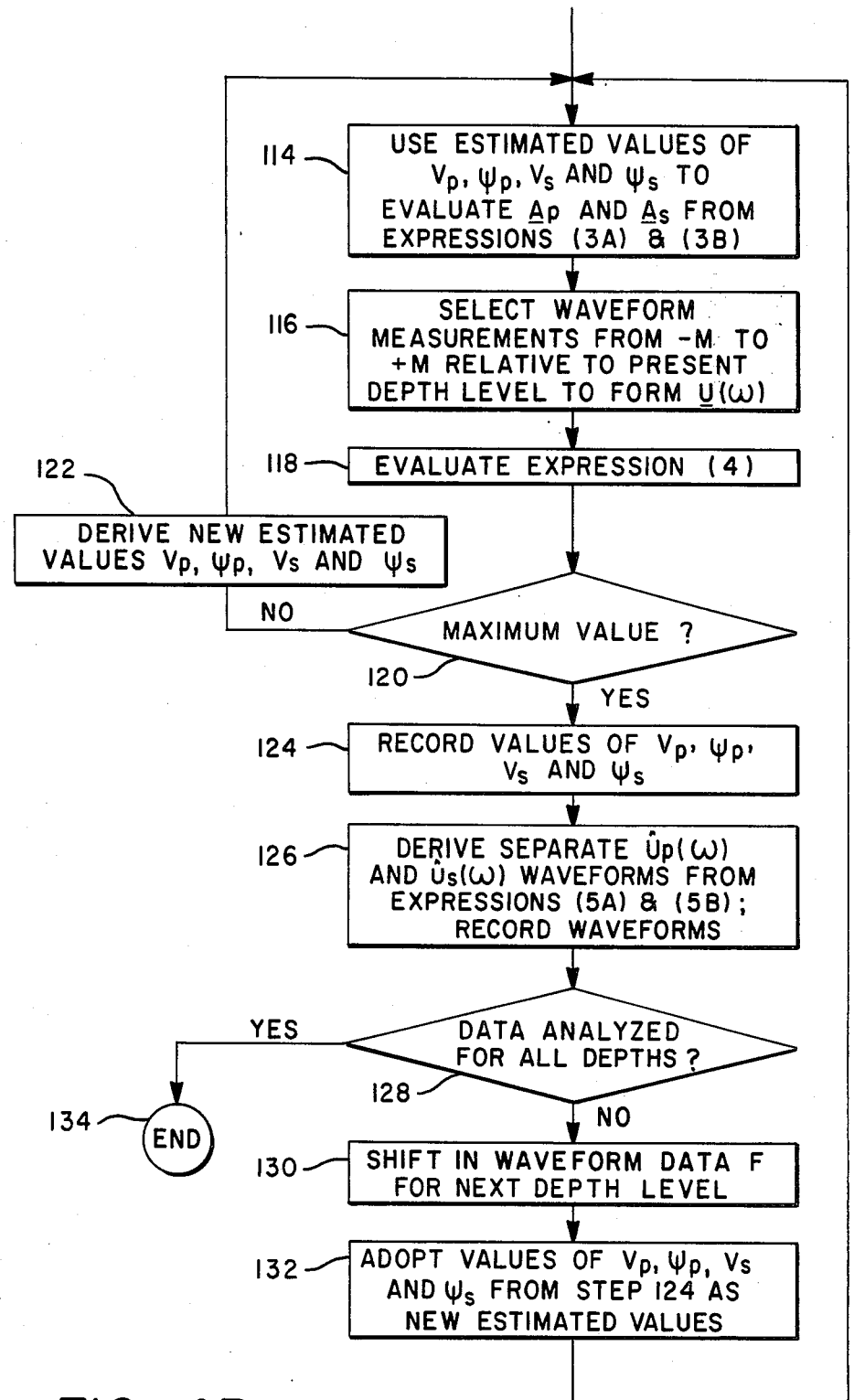

The procedure summarized above will now be described in more detail with reference to FIGS. 4a and 4b. At step 100, in FIG. 4a, a vertical seismic profiling operation is performed as shown in FIG. 1 to obtain waveform measurements along three orthogonal axes at a multiplicity of locations in the borehole 14.

Typicaly the orientation of the measurement axes of the geophones in the tool 10 is not coincident with that of the coordinate system illustrated in FIG. 2, since the orientation of the tool 10 about its longitudinal axis is uncontrolled. Accordingly, at step 102 the waveform measurements that would have been obtained had the geophone axes been aligned with the x-z plane of FIG. 2 are derived (a procedure known as rotating the data). If the orientation of the tool 10 is monitored during data acquisition the angular offset between the two sets of axes is known and this offset information can be used in conjunction with the recorded waveforms in known manner to perform the rotation. If the tool orientation is not known it is still possible to carry out the rotation operation using information in the three-component measurements themselves—see Esmersoy, C., "Polarization analysis, rotation and velocity and estimation in three component VSP", in Vertical Seismic Profiling, Part B: Advanced Concepts, M. N. Toksöz and R. R. Stewart (Ed.), Geophysical Press, 1984.

The (rotated) waveform data includes contributions both from direct, down-going seismic energy and from reflected, up-going energy. The subsequent analysis requires only the down-going components of the waveforms, so a velocity filter is applied in known manner at step 104 to separate the up-going and down-going components. The down-going components are selected for further analysis in accordance with this invention, while the up-going components may be retained for use in other techniques.

Direct shear waves from the source 26 and shear waves resulting from conversion of compressional wave energy near the surface may propagate at a different angle $\Psi_s$ compared to shear waves resulting from mode conversions at bed boundaries within the formation. In order to avoid obtaining a distorted value for the angle $\Psi_s$, it is therefore desired to separate shear wave components travelling at different angles and analyze them individually. Accordingly a technique known in the art and referred to as time-muting is applied at step 106 to the waveforms to exclude waveform components, such as direct shear waves, occurring outside a time window determined as part of the muting procedure.

At step 108 a Fourier transform procedure is applied to the waveforms to convert them into the frequency domain for the subsequent steps of the analysis.

The main procedure for evaluating $v_p$, $\Psi_p$, $v_s$ and $\Psi_s$ (steps 114 to 132 described below) at each depth level (measurement location) uses waveforms from a number M of depth levels above and below that depth level. At step 110 this number M is determined. Typical values for M are in the range one to five. For a given spacing D and signal-to-noise ratio, a smaller value of M provides better resolution but the possible inaccuracy in the estimated values produced is larger. At step 112 the first depth level for which parameters are to be evaluated is selected, for example the depth level M+1 measuremnt locations above the lowest such location.

The analysis to be described below requires estimates of the parameters $v_p$, $\Psi_p$, $v_s$ and $\Psi_s$ as a preliminary step to evaluation of expression (4). Once the derivation of these parameters for a first depth level has been accomplished, the derived values can be used as estimates for commencing the derivation for the next adjacent depth level. However, for the first depth level itself no such previous result exists. Accordingly at step 113 initial values appropriate to the first depth level are provided. Predetermined constant values of typical velocities and angles may be used, or specific values may be derived. For example, a polarization analysis may be made of the waveforms obtained in the vicinity of this first depth level, in order to derive initial estimates for the angles of incidence $\Psi_p$ and $\Psi_s$. This analysis may be performed for example as described in the above-mentioned Esmersoy article.

In principle the moveout of first breaks in the waveforms obtained near the first depth level can likewise be used to obtain similar estimates for the velocities $v_p$ and $v_s$. However, a direct computation of velocity, from the spacing between measurement locations of the tool 10 and from the moveout along the time axis between waveforms from adjacent measurement locations, will most likely provide an incorrect answer. This is because such a computation does not allow for the possibility that the seismic energy is propagating in a direction other than parallel to the borehole 14. Thus the estimates $\Psi_p$ and $\Psi_s$ of the angles of the actual directions of propagation must be incorporated in any initial estimation of the wave velocities from the first break moveouts.

The procedure then commences evaluating the required parameters for the first depth level, entering a loop at step 114. At this step the estimated values for $v_p$, $\Psi_p$, $v_s$ and $\Psi_s$ are used to evaluate the factors $d_p{}^m$ and $d_s{}^m$ appearing in expressions (3a) and (3b) as well as the vectors $h_p$ and $h_s$, and these factors and vectors are then used in evaluating expressions (3a) and (3b) to obtain the vectors $a_p$ and $a_s$. As indicated above, upon the first pass through the loop starting at step 114 the estimated values used are those obtained at step 113.

At step 116 the waveform measurements for the M measurement locations above and below the presently selected depth level are selected to form for each frequency $\omega$ the complex column vector $u(\omega)$. This vector and the vectors $a_p$ and $a_s$ determined at step 114 are then applied to the evaluation of expression (4), at step 118. In this connection it is useful to note that the denominators of the two fractions in expression (4) can be directly evaluated from the estimated angles $\Psi_p$ and $\Psi_s$ as follows:

$$\| a_p + a_s \|^2 = 2(2M+1) + 2 \sin(\Psi_s - \Psi_p) \sin[(2M+1)\alpha]/\sin \alpha \quad (6a)$$

$$\| a_p - a_s \|^2 = 2(2M+1) - 2 \sin(\Psi_s - \Psi_p) \sin[(2M+1)\alpha]/\sin \alpha \quad (6b)$$

where $\alpha = \frac{1}{2}\omega D(\cos \Psi_s/v_s - \cos \Psi_p/v_p)$.

Evaluation of the numerators of the fractions in expression (4) for a single frequency $\omega$ involves adding or subtracting the column vectors $a_p$ and $a_s$ element by element, changing the sign of the imaginary part of each element in the resulting sum or difference vector to produce its complex conjugate and transposing the elements to produce a row vector, multiplying this row vector by the column vector $u(\omega)$ for the frequency $\omega$ and obtaining the square of the magnitude of the resulting scalar quantity. Dividing the squared magnitudes by the appropriate denominator value from (6a) or (6b) gives the values of the two fractions which are added and then summed with the corresponding values for other frequencies $\omega$ to produce a value for expression (4).

A test is performed at step 120 to determine whether the maximum value of expression (4) has been found. This may be done, for example, by comparing the value obtained at step 118 with the value obtained in previous passes through the loop (except of course for the very first pass). If the value has changed by an amount less than some predetermined threshold (for example by less than $10^{-5}$ of the previous value), then the value obtained at step 118 is accepted as the maximum value, and the estimates of the parameters $v_p$, $\Psi_p$, $v_s$ and $\Psi_s$ used to obtain that value are accepted as the actual values of those parameters.

If the test at step 120 does not find a sufficiently small change in the value of expression (4), the procedure returns to step 114 via step 122 where new estimates for the the parameters $v_p$, $\Psi_p$, $v_s$ and $\Psi_s$ are derived. These estimates may be derived using known techniques such as a quasi-Newton method or the Fletcher-Powell method (Fletcher, R., "Practical methods of optimization—Volume 1, Unconstrained Optimization", John Wiley and Sons, 1980). Such techniques typically involve evaluating the (partial) derivatives of expression (4) with respect to each of the parameters $v_p$, $\Psi_p$, $v_s$ and $\Psi_s$ and testing them to find a combination of changes of appropriate magnitude in the values of these parameters which will alter the value of expression (4) towards its maximum.

When the test at step 120 indicates that the maximum value of expression (4) has been obtained to the desired degree of accuracy, the procedure continues to step 124 where the corresponding estimates of $v_p$, $\Psi_p$, $v_s$ and $\Psi_s$ are recorded as the actual values of these parameters. Thereafter the values of the vectors $a_p$ and $a_s$ evaluated at step 114 for the parameter values are used at step 126 as the estimated vectors $\hat{a}_p$ and $\hat{a}_s$ to derive separate compressional and shear waveforms $\hat{u}_p(\omega)$ and $\hat{u}_p(\omega)$ in accordance with equations (5a) and (5b). These separate waveforms are likewise recorded for further use.

At step 128 a test is performed to determine whether the waveforms for all depth levels have been analyzed. If not the procedure advances to step 130 where the waveform data for the next depth level is brought in to the group of 2M+1 waveform sets, replacing the data for the depth level at the other end of the 2M+1 measurement locations. The values for the parameters $v_p$, $\Psi_p$, $v_s$ and $\Psi_s$ found at step 124 are adopted as first estimates of their values at the next depth level, at step 132, and the procedure then returns to step 114 to evaluate the parameters.

When the test at step 128 determines that the data for all depth levels has been analyzed the procedure terminates at 134.

There has been described and illustrated herein a method in accordance with the present invention for evaluating parameters related to the elastic properties of subsurface earth formations. While particular embodiments of the invention have been described, it is not intended that the invention be limited thereby. Thus the description above envisages the measurement of seismic energy along three orthogonal axes with the tool 10. However, it is possible to practice the invention in the analysis of measurements obtained along only two orthogonal axes, if these axes are aligned with the x and z directions as shown in FIG. 2. Therefore it will be apparent to those skilled in the art that various changes and modifications may be made to the invention as described without departing from the spirit and scope of the appended claims.

I claim:

1. A method of estimating velocities and angles of incidence of compressional and shear waves traveling through a subsurface formation traversed by a borehole, said method comprising the steps of:
    (a) positioning an acousting source on the surface of the formation, said source positioned such that the source location x relative to the top of the borehole and the borehole depth z relative to the top of the borehole form an imaginary x-z plane intersecting the formation;
    (b) securing at least one transducer to a first depth position of an interior wall of the borhole, exciting said source to produce compressional and shear waves through the formation, detecting said waves at said at least one transducer such that a plural-axis measurement of formation displacement is obtained;
    (c) repeating said steps of securing, exciting and detecting for a plurality of additional depth positions along the interior wall of the borehole, thereby obtaining vertical seismic profile data thereof;
    (d) estimating, for one predetermined depth position chosen from said plurality of vertical seismic profile data depth positions, compressional and shear wave velocities and compressional and shear wave angles of incidence, relative to the x-z plane;
    (e) calculating phase shifts of said compressional and shear waves for said predetermined depth position, said phase shifts being a function of said estimated compressional and shear wave velocities and angles of incidence, said phase shifts further being a function of at least one depth position adjacent to said predetermined depth position;
    (f) calculating a predetermined error function, said error function being a function of said calculated phase shifts of said compressional and shear waves;
    (g) evaluating the value of said predetermined error function such that
        (i) if the value of said predetermined error function is within a predetermined tolerance criterion, go to step (h); and
        (ii) otherwise, calculate subsequent estimated values of compressional and shear wave velocities and angles of incidence as a function of current values of said compressional and shear wave velocities and angles of incidence, then go to step (e);
    (h) record said estimated values of compressional and shear wave velocities and angles of incidence.

2. The method of claim 1 further comprising the step of:
    repeating stpes (e) through (h) for at least one other depth position such that said recorded values of compressional and shear wave velocities and angles of incidence are utilized as said estimated compressional and shear wave velocities and angles of incidence in the first subsequent pass through step (e).

3. The method of claim 1 further comprising the steps of:
    determining the angular offset of the axis of said at least one transducer relative to the x-z plane;
    rotating said vertical seismic profile data to obtain vertical seismic profile data relative to to said x-z plane; and
    utilizing said rotated vertical seismic profile data in steps (d) through (h).

4. The method of claim 3 further comprising the steps of:

applying a velocity filter to said rotated vertical seismic profile data, thereby separating up-going and down-going components thereof; and selecting said down-going components for use in steps (d) through (h).

5. The method of claim 4 further comprising the steps of:

time-muting said selected down-going components so as to exclude waveform components occurring outside a predetermined time window; and utilizing said time-muting components in steps (d) through (h).

6. The method of claim 5 further comprising the step of:

applying a Fourier transform to said time-muted components, thereby converting said components into the frequency domain.

7. The method of claim 6 further comprising the step of:

calculating separate compressional and shear waveforms, said separate waveforms being a function of said recorded values of compressional and shear wave velocities and angles of incidence.

8. The method of claim 1 further comprising the step of:

calculating separate compressional and shear waveforms at said predetermined depth position, said separate waveforms being a function of said recorded values of compressional and shear wave velocities and angles of incidence.

9. The method of claim 8 further comprising the step of:

repeating steps (e) through (h) for at least one other depth position such that said recorded values of compressional and shear wave velocities and angles of incidence are utilized as said estimated compressional and shear wave velocities and angles of incidence in the first subsequent pass through step (e).

* * * * *